(12) United States Patent
Buck et al.

(10) Patent No.: US 12,007,046 B2
(45) Date of Patent: Jun. 11, 2024

(54) HYGIENIC COUPLING SYSTEM

(71) Applicant: ABB Schweiz AG, Baden (CH)

(72) Inventors: Meirion Buck, Swadlincote (GB);
Angel Francos, Birmingham (GB);
Harvinder Singh Chahal, Coventry (GB); Luis Uriol, Lichfield (GB)

(73) Assignee: ABB Schweiz AG, Baden (CH)

( * ) Notice: Subject to any disclaimer, the term of this patent is extended or adjusted under 35 U.S.C. 154(b) by 69 days.

(21) Appl. No.: 17/322,927

(22) Filed: May 18, 2021

(65) Prior Publication Data
US 2021/0364108 A1 Nov. 25, 2021

(30) Foreign Application Priority Data
May 19, 2020 (EP) .................................. 20175549.3

(51) Int. Cl.
*F16L 19/065* (2006.01)
*F16L 19/02* (2006.01)
*F16L 33/22* (2006.01)
*F16L 19/00* (2006.01)

(52) U.S. Cl.
CPC .......... *F16L 19/065* (2013.01); *F16L 19/005* (2013.01); *F16L 19/0218* (2013.01); *F16L 19/0231* (2013.01); *F16L 33/224* (2013.01); *F16L 2201/44* (2013.01); *F16L 2201/80* (2013.01)

(58) Field of Classification Search
CPC ... F16L 19/065; F16L 19/0212; F16L 33/224; F16L 2201/44; F16L 2201/80; F16L 41/088; A61M 2039/1033; A61M 2039/1038
See application file for complete search history.

(56) References Cited

U.S. PATENT DOCUMENTS

| 1,784,637 | A |  | 12/1930 | Lindgren |  |
|---|---|---|---|---|---|
| 3,879,065 | A |  | 4/1975 | Kobayashi |  |
| 4,033,614 | A | * | 7/1977 | Hanson | ............... F16L 33/224 |
| 2007/0017688 | A1 |  | 1/2007 | Pyron et al. |  |
| 2007/0057504 | A1 | * | 3/2007 | Boudry | ................. F16L 5/06 |
| 2009/0224536 | A1 | * | 9/2009 | Fukushima | ........... F16L 33/224 |

(Continued)

FOREIGN PATENT DOCUMENTS

| CN | 201932463 U | 8/2011 |
|---|---|---|
| CN | 103403431 A | 11/2013 |
| FR | 1554468 A | 1/1969 |

(Continued)

OTHER PUBLICATIONS

IP Australia, Examination Report No. 1 in Australian Patent Application No. 2021202947, 4 pp. (dated May 6, 2022).

(Continued)

*Primary Examiner* — Zachary T Dragicevich
(74) *Attorney, Agent, or Firm* — Leydig, Voit & Mayer, Ltd.

(57) ABSTRACT

A conduit clamping and sealing system includes: a bearing element including: a back segment with an external back thread for attaching to a device or fastening to a box or enclosure; a middle segment for receiving a conduit and guiding and/or aligning a hygienic sleeve system; and a front segment for receiving a seal, and a front nut for sealing a connection between the conduit and the bearing element and fastening the hygienic sleeve system.

17 Claims, 8 Drawing Sheets

(56) References Cited

U.S. PATENT DOCUMENTS

2014/0145436 A1     5/2014   Charcenko et al.

FOREIGN PATENT DOCUMENTS

JP          2007333176 A    12/2007
WO     WO 2013132585 A1    9/2013

OTHER PUBLICATIONS

IP Australia, Examination Report No. 2 in Australian Patent Application No. 2021202947, 7 pp. (dated Feb. 7, 2023).
European Patent Office, Partial European Search Report in in European Patent Application No. 20175549, 3 pp. (Oct. 23, 2020).

\* cited by examiner

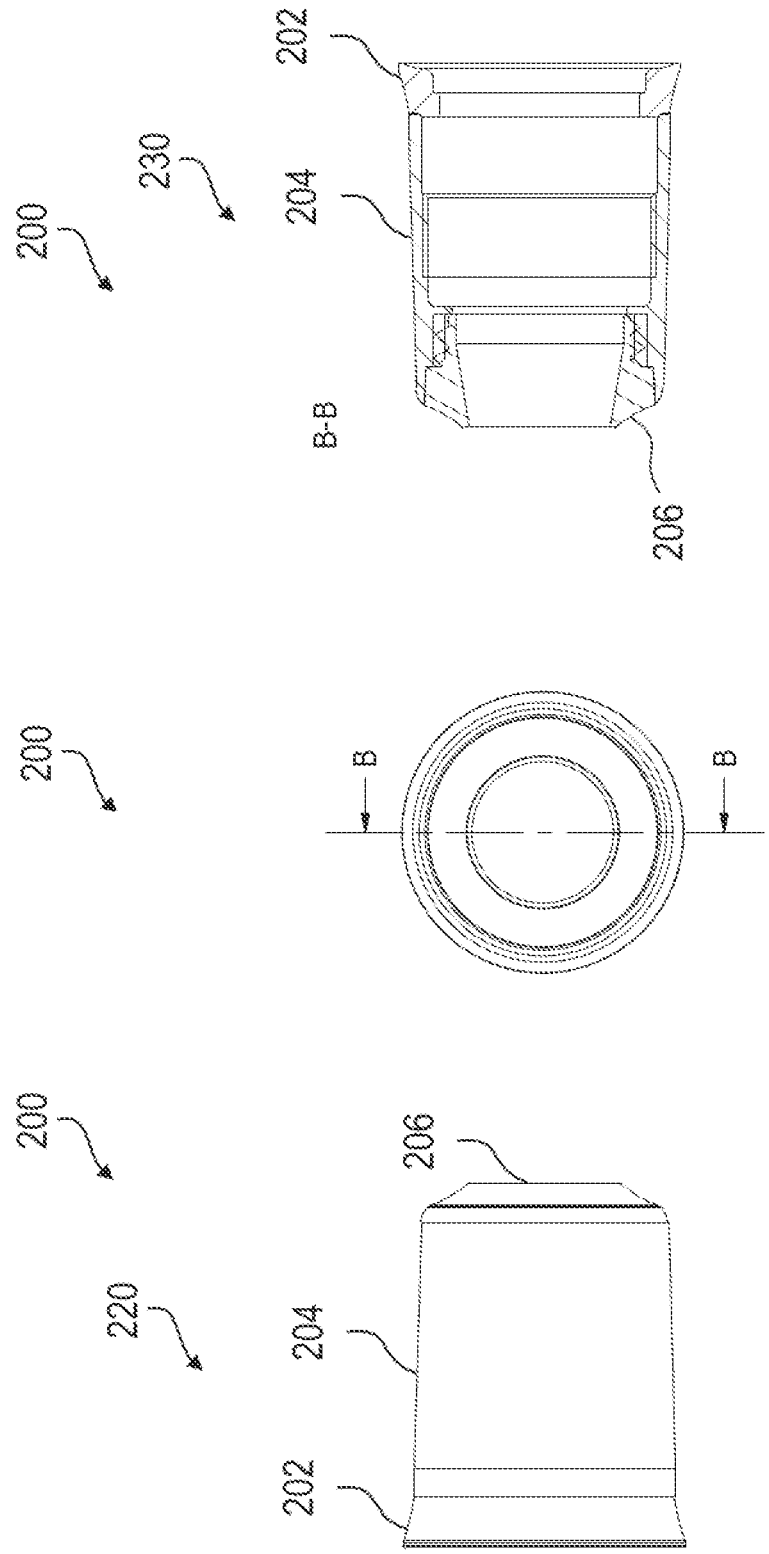

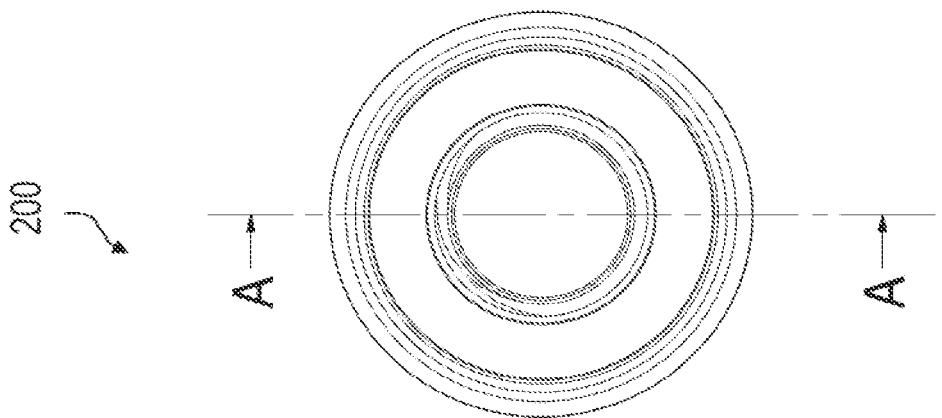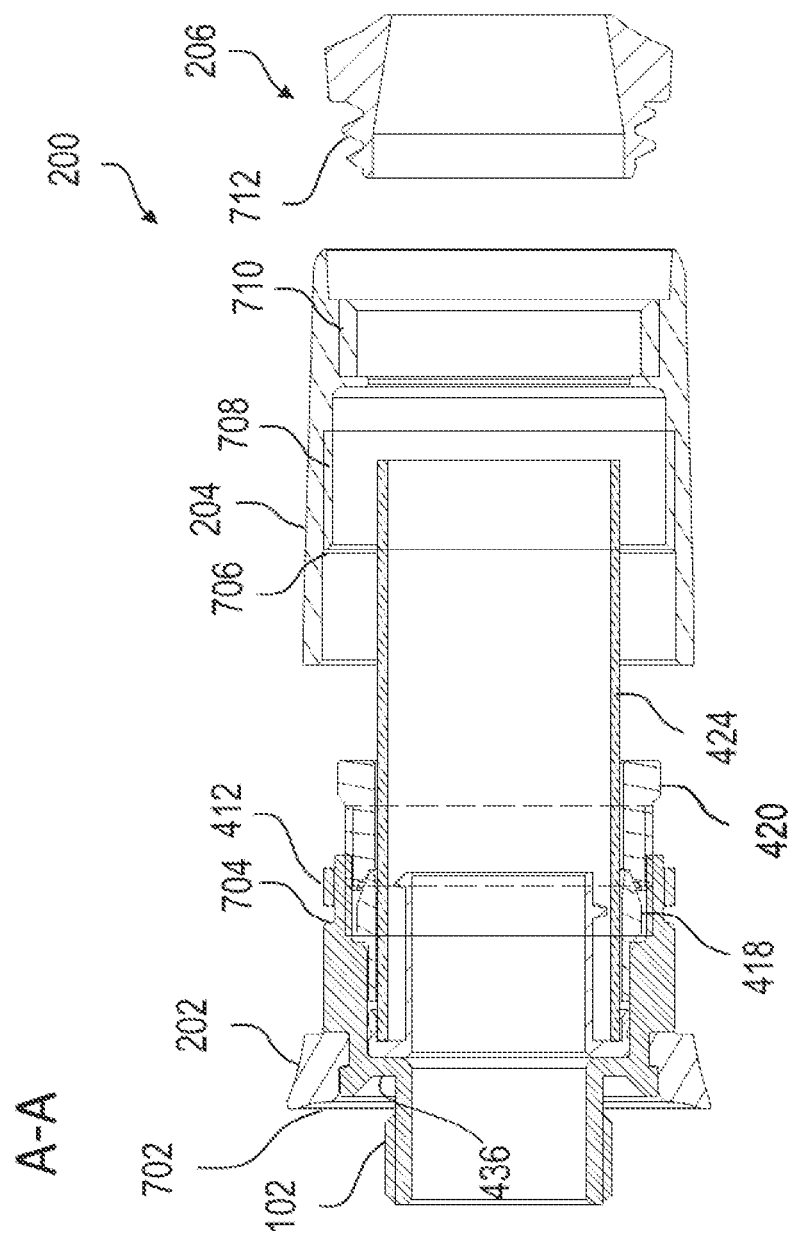

HYGIENIC COUPLING SYSTEM

CROSS-REFERENCE TO PRIOR APPLICATION

Priority is claimed to European Patent Application No. EP 20 175 549.3, filed on May 19, 2020, the entire disclosure of which is hereby incorporated by reference herein.

FIELD

The invention relates to a conduit clamping and sealing system, a hygienic sleeve system, and a hygienic coupling system comprising such sealing and hygienic sleeve systems.

BACKGROUND

Hygienic couplings are designed for the food, cosmetics, pharmaceutical and chemical industries as well as for biotechnology. In hygienic applications, there a several high requirements for such couplings. Especially, the coupling has to be reliable, tight, achieve controlled and predefined compression on exposed gaskets and has to be designed such that an accumulation of dust, dirt or other material is impeded. Further, the installation shall be easy and without much effort. Additionally, the requirements defined in the guide line released by European Hygienic Engineering and Design Group (EHEDG) for fittings shall be met.

SUMMARY

In an embodiment, the present invention provides a conduit clamping and sealing system, comprising: a bearing element, comprising: a back segment with an external back thread configured to attach to a device or fasten to a box or enclosure; a middle segment configured to receive a conduit and guide and/or align a hygienic sleeve system; and a front segment configured to receive a seal, and a front nut configured to seal a connection between the conduit and the bearing element and fasten the hygienic sleeve system.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 2A-2C shows an illustrative diagram of a hygienic sleeve system in a top view and a sectional view, FIGS. 7A-7B shows an illustrative diagram of a detailed sectional view of the hygienic sleeve system.

DETAILED DESCRIPTION

Figure 1C:
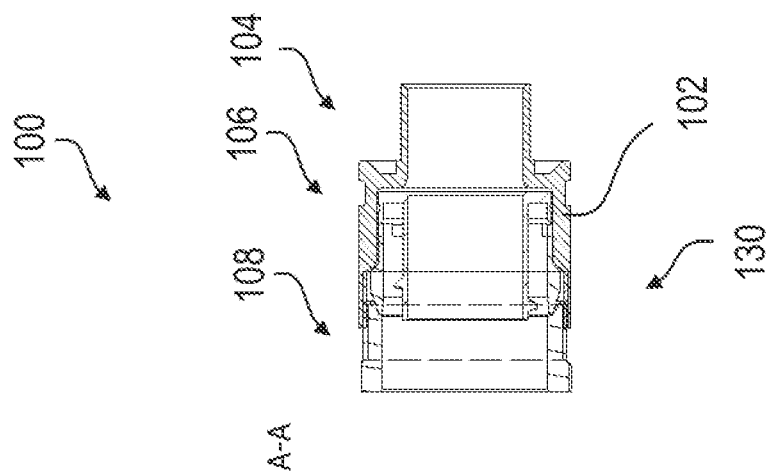
FIGS. 1A-1C shows an illustrative diagram of a conduit clamping and sealing system in a top view and a sectional view.

In an embodiment, the present invention provides a coupling system that fulfills the above-mentioned requirements. The described embodiments similarly pertain to the conduit clamping and sealing system, a hygienic sleeve system, and a hygienic coupling system. Synergetic effects may arise from different combinations of the embodiments although they might not be described in detail.

Technical terms are used by their common sense. If a specific meaning is conveyed to certain terms, definitions of terms will be given in the following in the context of which the terms are used.

Of a first aspect, a conduit clamping and sealing system is provided that comprises a bearing element as a main body, comprising a back segment with an external back thread for attachment to a device or fastening to a box or enclosure, a middle segment for receiving and sealing onto a conduit or tube, and guiding and/or aligning a hygienic sleeve system, and a front segment for receiving a seal and a front nut to seal a connection between a conduit and the bearing element and fastening a hygienic sleeve system.

In the following, the device, box or enclosure, or also a second conduit or tube that may be attached to or fastened to the back segment is designated "device" for short.

The bearing element or fitting hence represents the main body of the conduit clamping and sealing system. The bearing element is an integral element that can be subdivided from a functional and design aspect into three segments. The outer segments are designated back segment and front segment, respectively. The back segment comprises a thread, the external back thread, at which the fitting can be attached to a device or to be fastened to a box/enclosure. It would also be possible, to attach a further conduit at the back segment to the fitting. The diameter of the middle segment is greater than the diameter of the back segment, such that it can receive a conduit, which slides through the front segment to the middle segment, where it abuts at a wall due to the greater diameter. The conduit is kept in position using a nut which clamps the conduit as explained in more detail in the following. The diameter of the front segment is greater than the diameter of the middle segment.

Several further parts such as the nut, an insert element and a seal can be attached removable to the bearing element to obtain a flexible and sealed connection between the conduit and the device or box/enclosure. The bearing element is further designed such that it can receive a hygienic cap and gaskets that are part of a hygienic sleeve system so that a sealed coupling system is obtained with a seamless hygienic sleeve with predefined compression of exposed gaskets. Embodiments of the bearing element, the removable parts and the further design regarding the sleeve is described below.

Of the European Hygienic Engineering and Design Group (EHEDG) guide lines, exposed gaskets need to have predefined compression. A design with exposed gaskets which do not have predefined compression will not comply with EHEDG certification guidelines.

Of an embodiment, the conduit clamping and sealing system further comprises an insert part that is designed such that it extends along the inside of the conduit and has a U-shaped back end enclosing the circumferential corner at an opening of the conduit. The U-shaped backend of the insert part abuts against a vertical portion of the middle segment.

The insert part can be seen a U-shaped with edges that may be slightly rounded instead of a round "U". When attached to the conduit, the insert part has a short portion that resides against and rides along the outer surface of the conduit, a radial portion enclosing the edge of the opening, and a longer portion at the inside of the conduit, parallel and slightly distant to the conduit. A nose at the end of the longer portion impedes that the conduit crimps, when the nut is screwed in and presses a seal against the conduit, and provides a counter force so that the conduit is clamped. The radial portion further impedes a direct metal on metal contact between the conduit and the bearing element.

Of EHEDG guide lines, metal on metal contact needs to be avoided as this may harbor soil and microorganisms. A design with exposed metal on metal contact will not comply with EHEDG certification guidelines Of an embodiment, the conduit clamping and sealing system further comprises a seal, wherein the seal has a flat portion protruding into the inner horizontal portion of the middle segment, wherein "horizontal" is a direction parallel to the rotation axis of the cylindrical parts of the bearing element, and a shoulder abutting at a slanted edge at the transition from the horizontal portion to the front segment. In a assembled state, the flat portion is hence protruding in direction to the back end under the middle segment and has a first oblique transition to the shoulder portion, which has a second oblique transition to the outer end, i.e. the end in direction to the front end. The first transition abuts against an oblique transition from the middle segment to the front segment of the bearing element. The second transition receives the nut which has a corresponding transition and which presses the seal against the conduit when screwed in. The nut is also designated as "external threaded front nut" in this disclosure.

Therefore, of a further embodiment, the front segment of the conduit clamping and sealing system further comprises an internal thread and the front nut comprises a corresponding external thread. The external threaded front nut is configured to press the insert part against a vertical portion of the middle segment, wherein vertical is a radial direction perpendicular to the rotation axis, and the seal against the slanted edge at the transition from the horizontal portion to the front segment when it is screwed into the internal thread of the front segment. The rotation axis is the rotation axis of the bearing element, the conduit, or the nut, which is the same. Horizontal is thus defined here as the attitude when the conduit, i.e., the rotation axis of the conduit, has a horizontal attitude.

Of a further embodiment, the nut of the conduit clamping and sealing system comprises further a flat surface front end portion. Under "flat surface portion" is understood a portion of the nut that has flat surfaces in sections where a wrench or tool can be put on. This portion is located at the front end side of the nut.

Of a further embodiment, the surface of the horizontal portion of the middle segment of the bearing element has a flat portion. Similarly to the nut, a wrench or tool can be put on this portion.

Of a second aspect, a hygienic sleeve system is provided. The hygienic sleeve system comprises a back gasket, a front gasket, and a hygienic cap for covering a surface of the bearing element. The back gasket, the hygienic cap, and the front gasket form a sleeve unit with seamless transitions and with pre-defined compression on the gaskets. That is, the hygienic sleeve system comprises essentially three parts: a gasket on the back side, i.e., sealing the transition from the device or box/enclosure to the bearing element, a smooth hygienic cap as a central element covering an essential part of the bearing element, and a gasket on the front side, sealing the transition from the bearing element to the conduit. The three hygienic elements abut against each other seamlessly so that the sleeve unit forms quasi a single surface in which the compression of the gaskets is pre-defined. The conduit clamping and sealing system is covered by these three elements such that the bearing element and all further parts are covered by the hygienic sleeve system except of the back segment of the bearing element when the complete system is assembled.

Of an embodiment of the second aspect, the hygienic cap of the hygienic sleeve system comprises an inner thread in a hygienic cap front portion, and the front gasket comprises a corresponding external thread. That is, the front gasket can be screwed into the hygienic cap. The front gasket comprises a shoulder located at the center with respect to the horizontal direction of the gasket, and the hygienic cap has a corresponding space, serving as stopper when the gasket is screwed in, this stopper enables pre-defined compression of the front gasket.

Of a further embodiment of the second aspect, the back gasket and the front gasket of the hygienic sleeve system comprise an involute compression surface. When screwing a device or box/enclosure into the bearing element, the device or box/enclosure is pressed against the vertical part of the back gasket which is then pressed against the vertical part of the middle segment of the bearing element. From a vertical aspect, the vertical part has a sort of notch, into which the conduit slides and the gasket is pressed against. Since the friction between stainless steel and elastomers is extremely difficult to predict. An involute compression instead of an even compression is to be used in order to reduce these frictional effects.

Of a third aspect, a coupling system comprising a conduit clamping and sealing system and a hygienic sleeve system as described above is provided. The coupling system is hence the complete system comprising the two systems described above.

Of an embodiment of the third aspect, the middle segment of the conduit clamping and sealing system of the hygienic coupling system comprises a vertical portion that is configured such that the back gasket part can abut externally against a back side, the conduit can abut internally against the front side. The back gasket has an involute compression surface that is pressed by the device or box/enclosure against the vertical notch of the middle segment of the bearing element, thereby sealing the middle segment of the bearing element hygienically.

Of a further embodiment of the third aspect, the front segment of the conduit clamping and sealing system of the hygienic coupling system comprises an external thread, and the hygienic cap hygienic sleeve system comprises a corresponding inner thread in a hygienic cap middle portion. In this way the hygienic cap can be screwed together with the bearing element so that a tight connection is obtained.

Of a further embodiment of the third aspect, the horizontal portion of the middle segment comprises a notch for receiving the back gasket externally. That is, the back gasket is fixed by the pressure of the conduit against the involute compression surface to the vertical part of the middle segment of the bearing element, and by the fitting of the gasket with the horizontal notch. The gasket protrudes at the front end side over the horizontal part of the middle segment, so that the hygienic cap can abut against it seamlessly.

Of a further embodiment of the third aspect, the bearing element of the conduit clamping and sealing system of the coupling system comprises a friction lip, and the bearing element comprises a corresponding friction lip. The friction lip is the locking mechanism used to lock the hygienic sleeve system and the conduit clamping and sealing system together, in which the friction generated by the two flat vertical meeting surfaces impedes the unfastening of the two systems.

These and other features, aspects and advantages of the present invention will become better understood with reference to the accompanying figure and the following description.

Figure 1B:
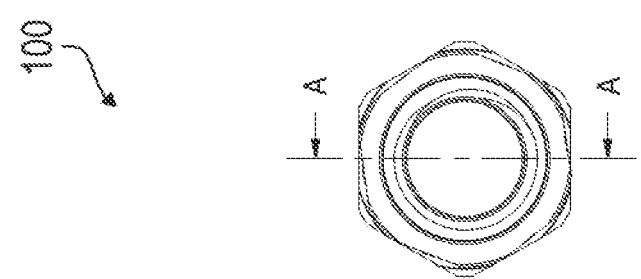
Figure 1A:
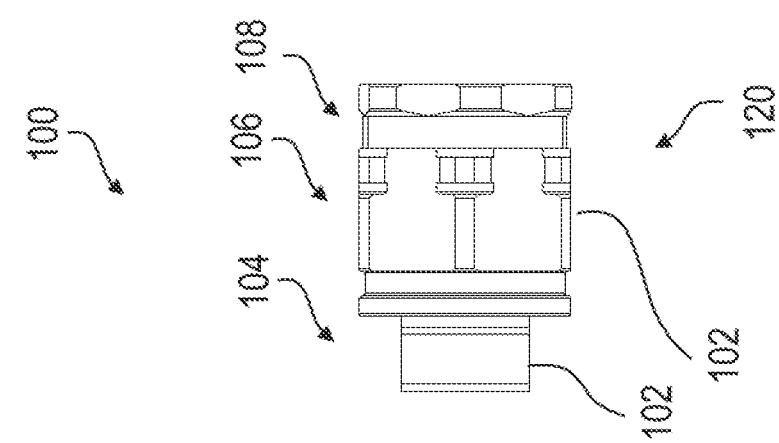

FIGS. 1A-1C shows a diagram of the conduit clamping and sealing system 100 in a top view 120 and a sectional view 130 with a bearing element 102 comprising a back segment 104 with an external back thread for receiving a device or box/enclosure, a middle segment 106 for receiving a conduit, a front segment 108 for receiving a seal and a front nut to seal a connection between the conduit and the bearing element 102.

FIGS. 2A-2C shows hygienic sleeve system in a top view 220 and a sectional view 230 comprising a back gasket 202, a front gasket 206, a hygienic cap 204 for covering a surface of the bearing element 102, wherein the back gasket, the hygienic cap, and the front gasket form a sleeve unit with seamless transitions.

Figure 3C:
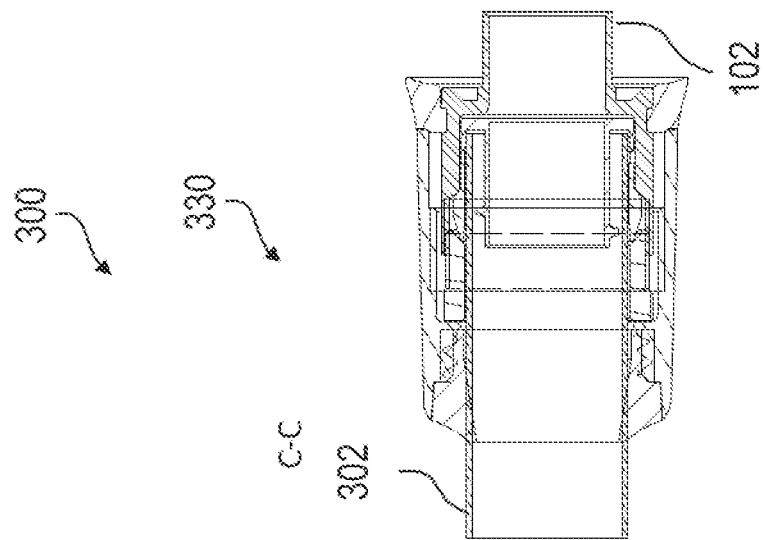
FIGS. 3A-3C shows an illustrative diagram of a coupling system in a top view and a sectional view.
Figure 3B:
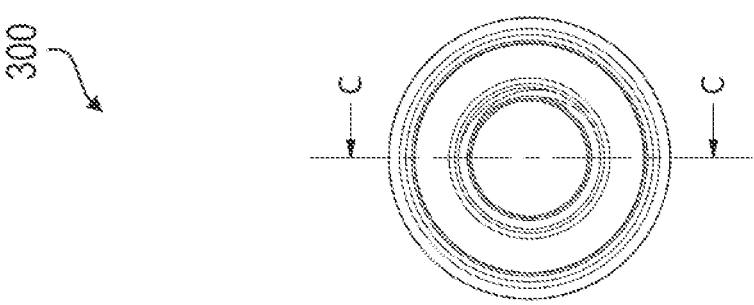
Figure 3A:
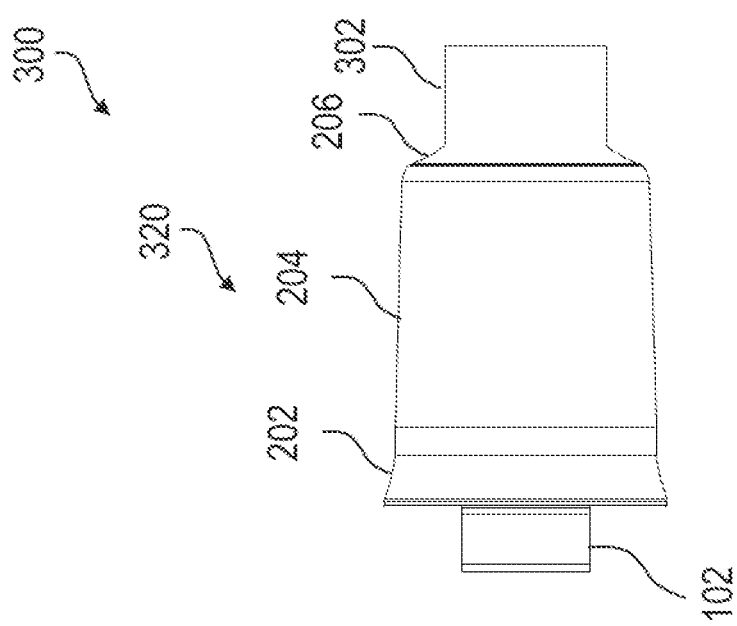

FIGS. 3A-3C shows a hygienic coupling system 300 in a top view 320 and a sectional view 330 comprising a conduit clamping and sealing system 100 and a hygienic sleeve system 200. The figure shows an assembled system. The top view 320 illustrates the visible parts of the system, which are essentially the parts 202, 204, 206 of the hygienic sleeve system 200 and a part of the bearing element 102, and the protruding conduit, which is not part of the system 300.

Figure 4B:
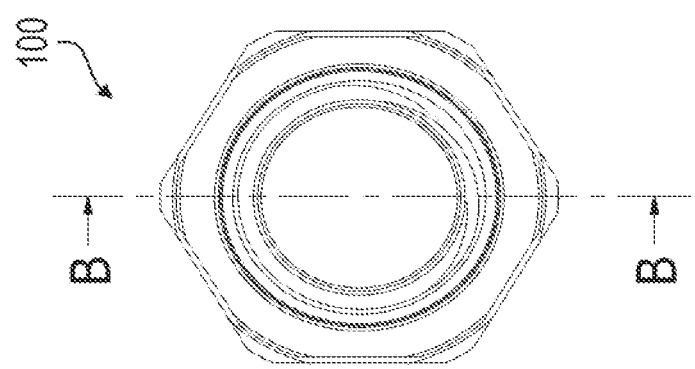
FIGS. 4A-4B shows an illustrative diagram of a detailed sectional view of the conduit clamping and sealing system.
Figure 4A:
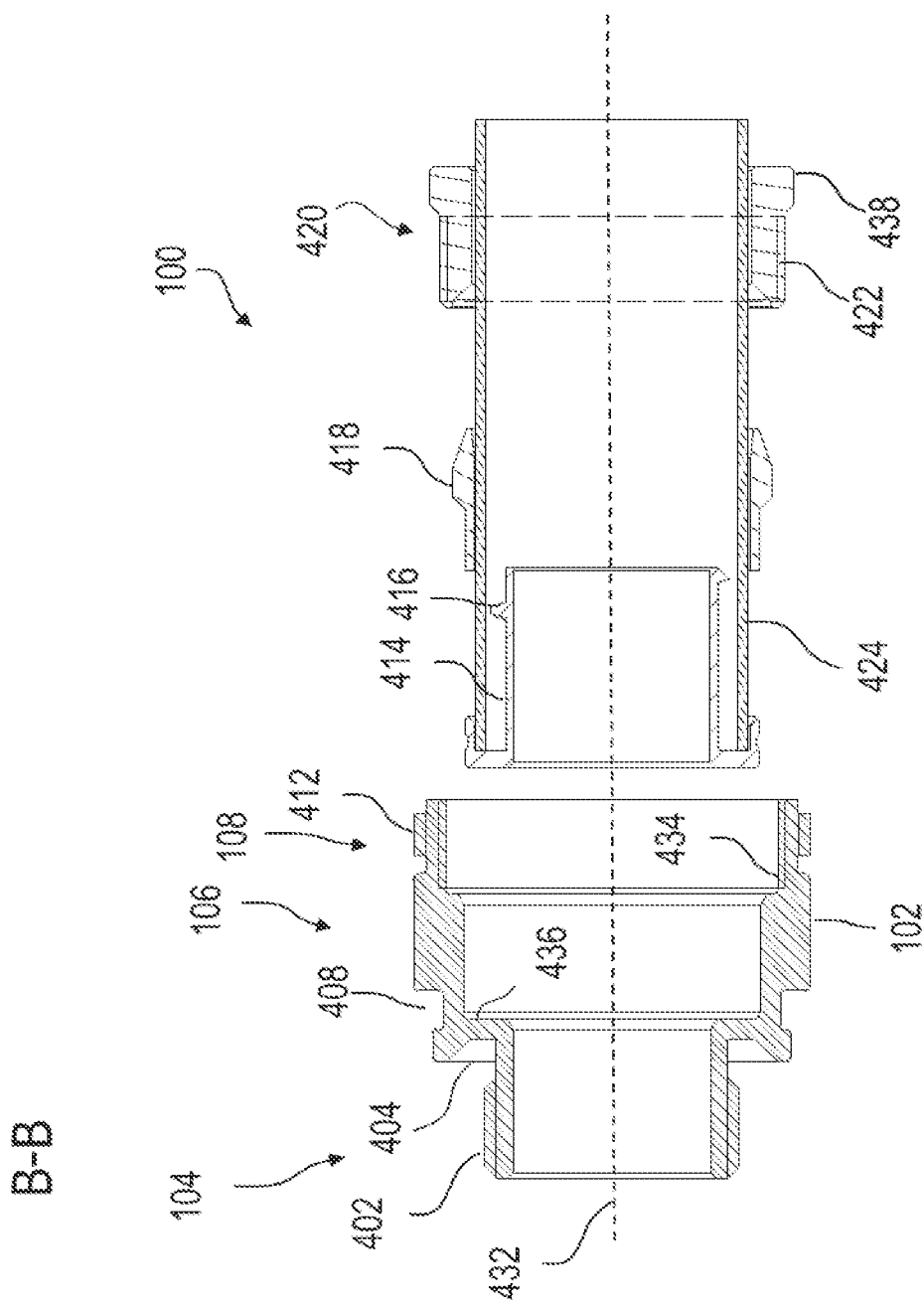

FIGS. 4A-4B shows an illustrative diagram of a detailed sectional view of the conduit clamping and sealing system. The back segment 104 has an external thread 402 for connecting a back side conduit (not shown in FIGS. 4A-4B). Note that the subdivision of the bearing element into back, middle and front segment is provided here only for reasons of a clearer description, and no strict definition of these segments exists. The back end side is the left side in FIGS. 4A to 9, and the front end side is the right side in FIGS. 4A to 9. Thus, "vertical" is defined as a radial direction, and "horizontal" as a direction parallel to the rotation axis 432. The middle segment 106 comprises a vertical part which forms a first notch, and a horizontal part which forms a further notch 408. The purpose of the notches is to support a sealing by a gasket, and the fixing of that gasket. The diameter of the middle segment is greater than the back segment such that a vertical wall 436 at the transition between these segments 104, 106 is formed. When inserting a conduit from the right side in FIGS. 4A-4B, conduit 424 with insert 414 are abutted against the vertical wall 436. The front segment 108 comprises an external thread 412 for connecting a hygienic cap, and an inner thread 434. Nut 420 has an external thread 422 corresponding to the internal thread 434 for connecting the nut 420, to the bearing element 102 and fixing seal 418. The nut 420 has flat surface portion 438, whose shape is visible more clearly in FIG. 5. Seal 418 has a flat portion which is moved under the horizontal wall of the middle segment 106, an inclined transition to a shoulder portion. The inclined transition fits to the transition from the middle segment to the front segment inside the bearing element 102, and an inclined part on the right side such that the nut 420 presses the seal against the conduit 424 when screwed together. The insert 414 extends along the inside of the conduit 424, and has a U-shaped back end enclosing the circumferential corner at an opening of the conduit 424. The U-shaped back end of the insert part 414 abuts against the vertical portion 436 of the middle segment. The insert 414 further comprises a nose 416 at the end of the longer portion, which impedes that the conduit 424 crimps, when the nut 420 is screwed in and presses a seal against the conduit 424. Furthermore, the nose 416 provides a counter force so that the conduit 424 is clamped.

Figure 5:
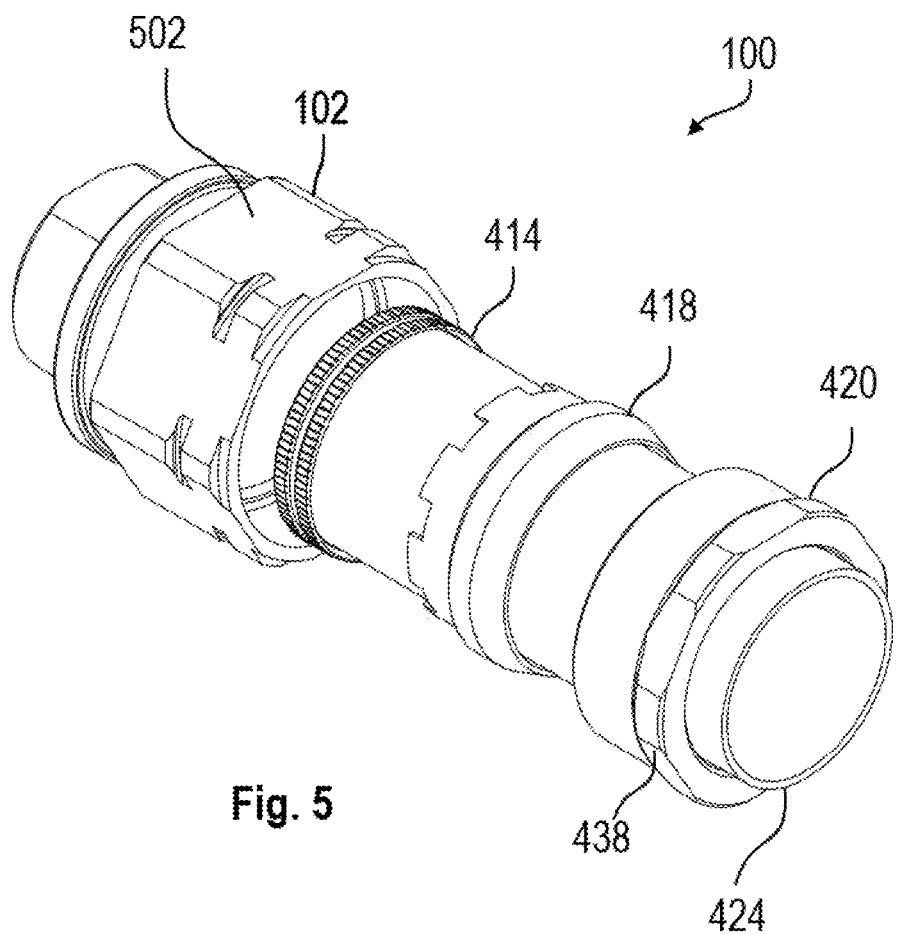
FIG. 5 shows an illustrative 3D-diagram of a detailed sectional view of the conduit clamping and sealing system.

FIG. 5 shows an illustrative 3D-diagram of a detailed sectional view of the conduit clamping and sealing system with its main components bearing element 102, insert 414, seal 418, and nut 420. The nut 420 and the bearing element comprise portions with flat surfaces 438 and 502, respectively, for receiving a tool for supporting connecting the device or box/enclosure and the nut 420 and thereby the conduit to the bearing element 102 as explained above.

Figure 6:
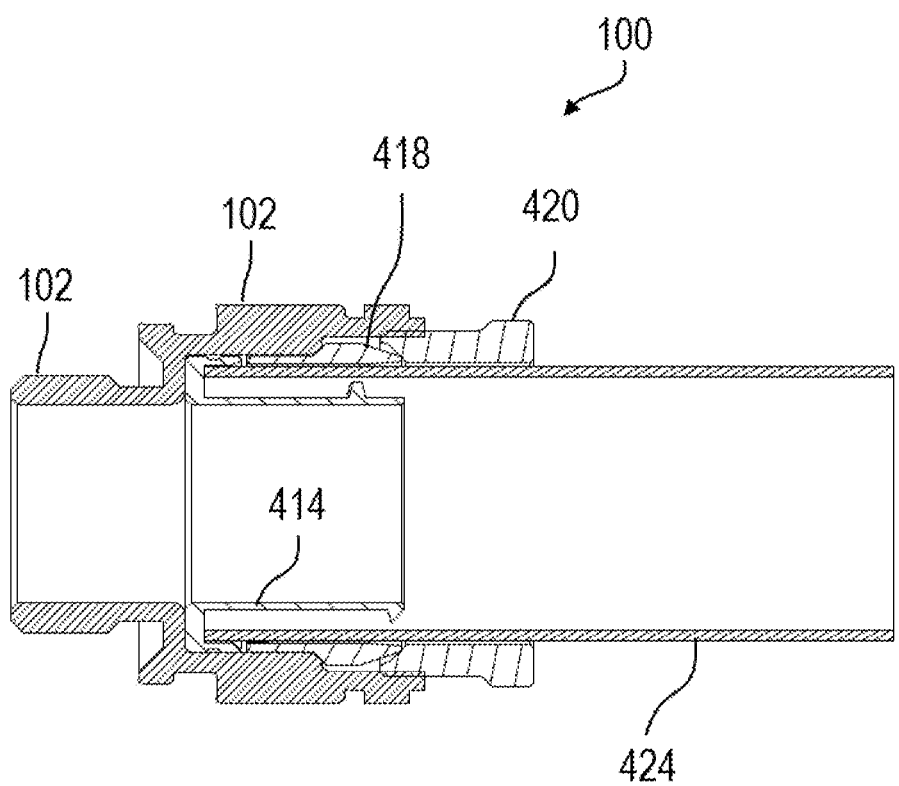
FIG. 6 shows an illustrative diagram of a detailed sectional view of the conduit clamping and sealing system in an assembled state.

FIG. 6 shows an illustrative diagram of a detailed sectional view of the conduit clamping and sealing system in an assembled state. The reference signs correspond to the ones in FIGS. 4 and 5, respectively.

FIGS. 7A-7B shows an illustrative diagram of a detailed sectional view of the hygienic sleeve system 200. The components of the hygienic sleeve system 200 are the back gasket 202, the hygienic cap 204, and the front gasket 206. The back gasket 202 comprises an involute compression surface 702 that is pressed against the vertical wall 436 when the device or box/enclosure is screwed in. The upper part is designed such that it fits to the bearing element 102. The hygienic cap 204 comprises a notch or a friction lip 706 that corresponds to a friction lip 704 of the hygienic cap. Furthermore, the hygienic cap 204 comprises a first internal thread 708 that corresponds to the external thread 412 of the bearing element. A second internal thread 710 corresponds to the external thread 712 of the front gasket 206. Thus, the front gasket 206 comprises a thread portion so that it can be screwed into the corresponding thread 710 of the hygienic cap 204.

Figure 8:
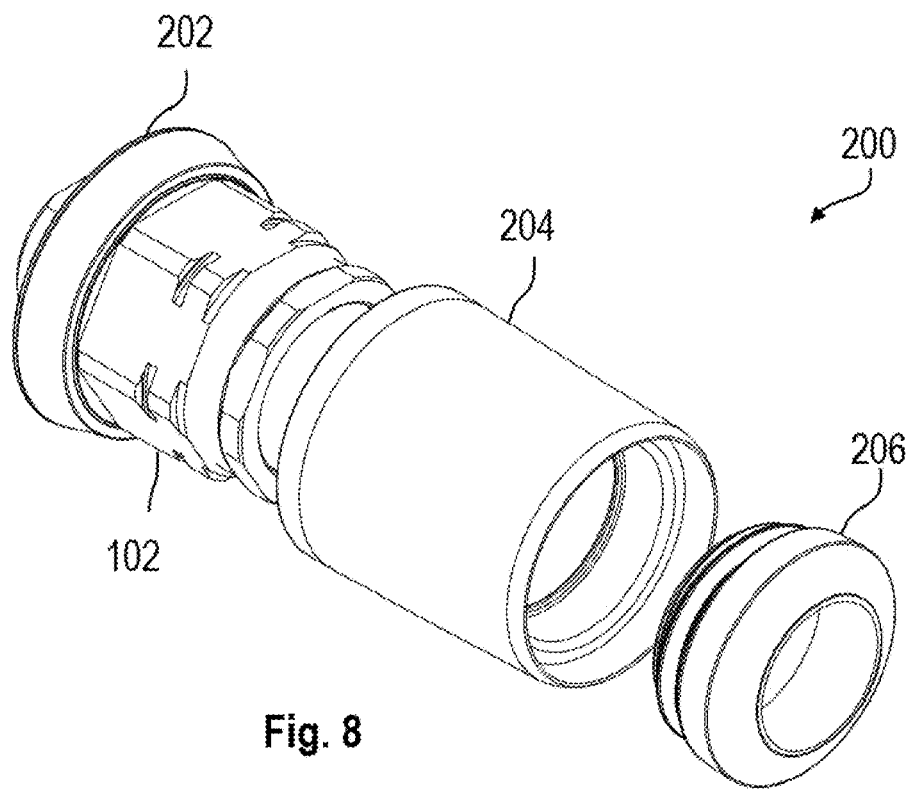
FIG. 8 shows an illustrative 3D-diagram of a detailed sectional view of the hygienic sleeve system.

FIG. 8 shows an illustrative 3D-diagram of a detailed sectional view of the hygienic sleeve system 200 with the back gasket 202, the hygienic cap 204, and the front gasket 206.

Figure 9:
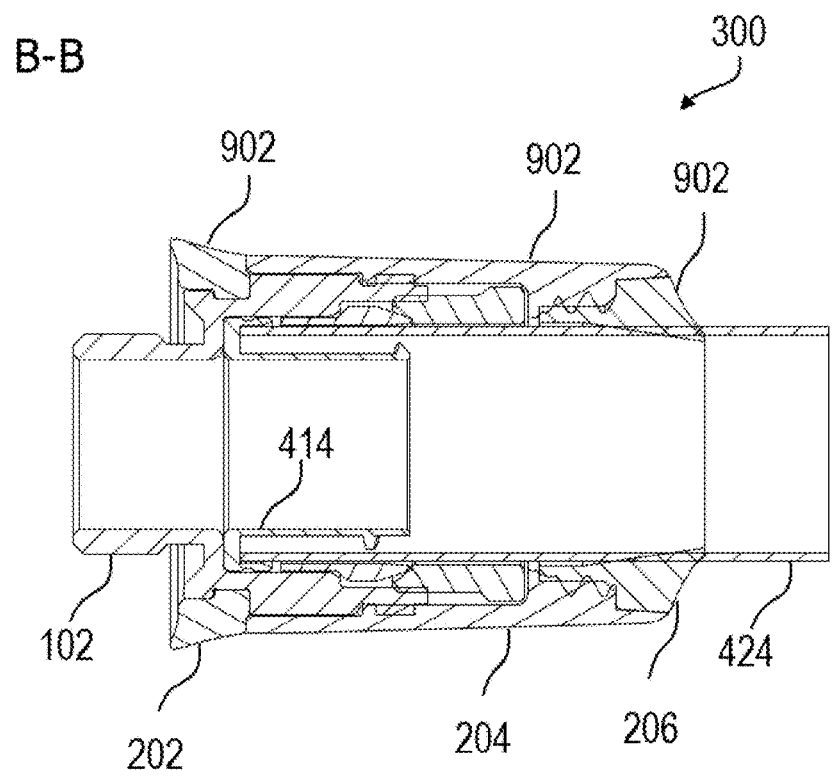
FIG. 9 shows an illustrative diagram of a detailed sectional view of the hygienic sleeve system and the conduit clamping and sealing system in an assembled state.

FIG. 9 shows an illustrative diagram of a detailed sectional view of the hygienic sleeve system and conduit clamping and sealing system in an assembled state which build the hygienic coupling system 300. The visible surfaces are indicated by reference signs 902.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A hygienic coupling system comprising a conduit clamping and sealing system and a hygienic sleeve system, wherein:
   the conduit clamping and sealing system comprises:
      a bearing element comprising:
         a back segment with an external back thread for attachment to a device or fastening to a box or enclosure;
         a middle segment configured to receive a conduit and to guide and/or align the hygienic sleeve system; and
         a front segment for configured to receive a seal; and
      a front nut to seal a connection between the conduit and the bearing element and to fastening the hygienic sleeve system; and
   the hygienic sleeve system, comprising:
      a back gasket;
      a front gasket; and
      a hygienic cap configured to cover a surface of the bearing element,
      wherein the back gasket, the hygienic cap, and the front gasket form a sleeve unit with seamless transitions and with pre-defined gasket compression, wherein the sleeve unit encloses the conduit clamping and sealing system.

2. The hygienic coupling system of claim 1, wherein the middle segment of the conduit clamping and sealing system comprises a vertical portion configured such that the back gasket part abuts externally at a back side and the conduit abuts internally at the front side.

3. The hygienic coupling system of claim 1, wherein the front segment comprises an external thread and the hygienic cap comprises a corresponding inner thread in a hygienic cap middle portion.

4. The hygienic coupling system of claim 1, wherein a horizontal portion of the middle segment comprises a notch configured to receive the back gasket externally.

5. The hygienic coupling system of claim 1, wherein the bearing element comprises a friction lip.

6. The hygienic coupling system of claim 5, wherein the hygienic cap comprises a second friction lip, wherein the second friction lip corresponds to the friction lip.

7. The hygienic coupling system of claim 1, wherein the back gasket is configured to seal a transition from the device, box, or enclosure to the back segment of the bearing element.

8. The hygienic coupling system of claim 1, wherein the front gasket is configured to seal a transition from the front segment of the bearing element to the conduit.

9. The hygienic coupling system of claim 1, further comprising: an insert part configured to extend along and inside of the conduit and having a U-shaped back end enclosing a circumferential corner at an opening of the conduit, wherein the U-shaped back end of the insert part abuts against a vertical portion of the middle segment.

10. The hygienic coupling system of claim 1, further comprising: a seal, the seal having a flat portion protruding into an inner horizontal portion of the middle segment, horizontal being a direction parallel to a rotation axis of the bearing element, and a shoulder abutting at a slanted edge at a transition from the horizontal portion to the front segment.

11. The hygienic coupling system of claim 10, wherein the front segment further comprises an internal thread, wherein the front nut comprises a corresponding external thread, and wherein the front nut is configured to press the insert part against a vertical portion of the middle segment, vertical being a radial direction perpendicular to the rotation axis, and the seal against the slanted edge at the transition from the horizontal portion to the front segment when the front nut is screwed into the internal thread of the front segment.

12. The hygienic coupling system of claim 1, wherein the front nut comprises a flat surface front end portion.

13. The hygienic coupling system of claim 1, wherein a surface of the horizontal portion of the middle segment of the bearing element is flat.

14. The hygienic coupling system of claim 1, wherein the hygienic cap comprises an inner thread in a hygienic cap front portion and the front gasket comprises a corresponding external thread.

15. The hygienic coupling system of claim 1, wherein the back gasket and front gasket comprise an involute compression surface.

16. A hygienic coupling system comprising a conduit clamping and sealing system and a hygienic sleeve system, wherein:
   the conduit clamping and sealing system comprises:
      a bearing element comprising:
         a back segment with an external back thread for attachment to a device or fastening to a box or enclosure;
         a middle segment configured to receive a conduit and to guide and/or align the hygienic sleeve system; and
         a front segment for configured to receive a seal; and
      a front nut to seal a connection between the conduit and the bearing element and to fastening the hygienic sleeve system; and
   the hygienic sleeve system, comprising:
      a back gasket;
      a front gasket; and
      a hygienic cap configured to cover a surface of the bearing element,
      wherein the back gasket, the hygienic cap, and the front gasket form a sleeve unit with seamless transitions and with pre-defined gasket compression, and
      wherein the hygienic cap comprises an inner thread in a hygienic cap front portion and the front gasket comprises a corresponding external thread.

17. A hygienic coupling system comprising a conduit clamping and sealing system and a hygienic sleeve system, wherein:
the conduit clamping and sealing system comprises:
a bearing element comprising:
a friction lip;
a back segment with an external back thread for attachment to a device or fastening to a box or enclosure;
a middle segment configured to receive a conduit and to guide and/or align the hygienic sleeve system; and
a front segment for configured to receive a seal; and
a front nut to seal a connection between the conduit and the bearing element and to fastening the hygienic sleeve system; and
the hygienic sleeve system, comprising:
a back gasket;
a front gasket; and
a hygienic cap configured to cover a surface of the bearing element, wherein the back gasket, the hygienic cap, and the front gasket form a sleeve unit with seamless transitions and with pre-defined gasket compression, wherein the hygienic cap comprises a second friction lip, and wherein the second friction lip corresponds to the friction lip.

* * * * *